United States Patent Office 2,804,388

Patented Aug. 27, 1957

2,804,388

LITHOGRAPHIC PLATE AND METHOD OF MANUFACTURING SAME

Thomas U. Marron, Glenview, Ill., and James L. Diedrich, St. Paul, Minn., assignors to A. B. Dick Company, Niles, Ill., a corporation of Illinois No Drawing. Application November 28, 1952, Serial No. 323,134

11 Claims. (Cl. 96—33)

This invention relates to a lithographic plate and to a method for producing same and it relates more particularly to a flexible plate of the type used for office duplication by lithographic technique and which may be prepared for use by exposure to a film positive. A plate of the type described will hereinafter be referred to as a "positive working plate."

For the most part, lithographic plates used in the production of copy are of the direct image type wherein a suitable flexible backing sheet is provided with a lithographic surface which is hydrophilic in character, water receptive and ink repellent. The image is formed thereon directly by application of a water repellent, ink receptive composition usually formulated with an oily or grease base. On application of the imaging material to the lithographic surface, the imaged portion becomes ink receptive and water repellent while the non-imaged portion of the plate remains water receptive and ink repellent so that, after the surface of the plate has been wet out, ink composition will be received only by the water repellent, ink receptive portion for transfer onto a blanket in offset printing or for application directly onto copy sheets in direct printing.

Other than the direct imaged plate, considerable use is made of presensitized photographic plates in which the backing sheet having a lithographic surface is treated with a light sensitive material which upon exposure to light causes the activated portion to become ink receptive and water repellent while the non-exposed portions retain their hydrophilic character and remain water receptive and ink repellent. Such indirect photographic or light sensitive plates are prepared in various combinations. In one, the lithographic surface is compounded of a hydrophilic colloid of the type casein, polyvinyl alcohol and the like sensitized with a bichromate or silver halide. Upon exposure the light sensitive material reacts with the colloid to convert the material from a water receptive hydrophilic substance to a water repellent hydrophobic ink receptive material and which then functions as the image in the lithographic surface. Masters of the type described have also been successfully presensitized with light sensitive diazo compositions which upon exposure react to form an ink receptive, water repellent resinous material in the exposed areas. In both of these presensitized photographic or light sensitive systems, it is necessary first to produce a film or other negative for use to form the image on the presensitized master by exposure and it is necessary also in the use of such presensitized plates to remove all of the unreacted sensitizing material after the imaged plate has been formed to avoid further reaction.

To the best of our knowledge, no one to the present has produced a commercially successful positive working plate—that is, one in which it is not necessary to first make a film or other negative for exposure but in which the image can be formed on the plate by direct exposure through a film or paper positive.

An object of this invention is to produce a positive working lithographic plate of the type described and it is a related object to provide a simple and expedient method for producing same.

A further object is to produce a lithographic master capable of being imaged by a film or other positive upon exposure to ultraviolet light and it is a related object to produce a master of the type described which is of relatively low cost and easy to manufacture, which is not so sensitive as to require use within a prescribed short period of time, and which forms an image which is substantially permanent in character and available on the plate surface to produce a large number of acceptable copies.

The basic concepts of the present invention reside in the coating of a hydrophilic water receptive surface with a compound which is unstable to light and upon exposure releases hydrofluoric acid and the use of this compound in combination with an organo-silicon compound which renders the entire surface hydrophobic and ink receptive but which upon reaction with the released hydrofluoric acid is converted into a product which can either be washed from the surface to expose the underlying hydrophilic surface or is itself converted to a hydrophilic substance—either of which provides the water receptive non-imaged portion of the plate while the area in which hydrofluoric acid is not released upon exposure remains ink receptive to form the image.

A number of variations are available in the practice of this invention and for purposes of simplification and explanation, description will be made of a method for manufacturing a master of the type described and processing same for the production of an image thereon from a film or other positive.

*Example 1.*—An aluminum plate which has been scratch-brushed and silicated by treatment with a hot water solution of about 10 percent sodium silicate and sodium hydroxide followed by washing to remove the silicate to form the hydrophilic water receptive, ink repellent surface, is coated with a 5 percent solution of a water soluble light sensitive salt formed by the reaction of one molecular weight ammonium fluoborate with one molecular weight of para-diazo diethyl aniline zinc chloride. The composition is applied as an aqueous solution preferably containing from 10–15 percent by weight acetone to improve the stability thereof and to increase solubility. The composition is washed onto the surface as by a flow coating or spray process and then dried, preferably without heat.

The dried surface is subsequently coated with an organo-silicon compound in amounts to form a water repellent, hydrophobic ink receptive surface and then allowed to air dry. The organo-silicon is able through the silicon atoms to become firmly attached to the underlying surfaces and the organic groups of the organo-silicon compound function to convert the normally hydrophilic surface into one which is fully hydrophobic and receptive to ink compositions used in lithographic printing. To this point a master sheet is produced which is ink receptive overall.

The image is formed by a reverse process as compared to the photo-sensitive plates previously described. Instead of exposing the plate to light through a negative for reaction to convert the material from a hydrophilic substance to one that is hydrophobic to form the image therein, exposure is made by ultraviolet light through a film or other positive. The light which penetrates through the film or other positive into the coatings causes the unstable diazo fluoborate to react and release hydrofluoric acid which upon release reacts with the organo-silicon compound and thereby eliminates the hydrophobic substance and enables the exposed areas to regain their hydrophilic water receptive and ink repellent character. The unreacted organo-silicon in the unexposed portions remains ink receptive and water repellent to form the image.

By way of further explanation, it is believed that the ultraviolet light penetrating through the film or other positive causes the light sensitive fluoborate salt to release hydrofluoric acid which reacts with the organo-silicon compounds in a conventional manner to break down the silicate whereby it loses its hydrophobic characteristics. The decomposition product, as it will be called, is preferably rinsed with a phosphoric acid solution to effect substantially complete removal from the surface whereby the hydrophilic water receptive silicated aluminum surface again becomes uppermost to provide the non-imaged portion of the plate. Furthermore, the undecomposed fluoborate salt in the unexposed areas is removed by this rinse thereby avoiding the possibility of decomposition during subsequent handling. The plate is then lacquered or coated with a transfer ink to set the image on the plate surface.

When the imaged plate is mounted in the duplicating machine, the repellent wets out the exposed aluminum surface which forms the non-imaged portion and the lithographic inks wet the imaged portion formed of the unreacted organo-silicon whereby the ink may be received and transferred to produce copy.

While it is preferred to make use of a base plate formed of a metal of the type aluminum, use can be made of other lithographic surfaces such as are produced of coated papers in the manufacture of direct imaged plates or photo-sensitive plates. Base sheets of the type described may include plates formed of paper or other sheet stock coated with an alginate, as described in the copending application of Anthony L. Ensink, Ser. No. 260,327, or of casein, carboxy methyl cellulose and the like colloid materials, as described in Mullen Patent No. 2,604,848; Worthen Patent No. 2,534,650; Van Dusen Patent No. 2,542,784, and the like. With such plates having a lithographic surface formed thereon, the light sensitive fluoborate salt and the organo-silicon may be applied thereon in the order described or in admixture in a single coating composition when compatible.

Instead of the fluoborate of para-diazo diethyl aniline zinc chloride, use may be made of the salts formed of fluoboric acid and other heat and light unstable diazo compounds which upon exposure to light or heat decompose with some liberation of hydrofluoric acid. It is believed that upon exposure to heat or ultraviolet light, the fluoborates of such unstable diazo compounds, generally of low molecular weight and having an aryl group, become reassociated to give mixtures of products in which the diazo group N=N— is replaced by OH or F to form the corresponding phenols and fluorides. When these phenols are formed, hydrofluoric acid is liberated. A number of the fluoborate salts of the diazo compounds may be used. Excellent results have been secured by the use of para-diethyl amino benzene diazonium fluoborate, para-methoxy benzene diazonium fluoborate, para-nitro benzene diazonium fluoborate, para-diazonium anisol fluoborate, para-diethyl amino benzene diazonium fluoborate, diazonium fluoborate salts made from ortho-, meta- and para-toluene, such as 1-methyl benzene diazonium fluoborate, 2-methyl benzene diazonium fluoborate, 3-methyl benzene diazonium fluoborate, 2,4-dimethyl benzene diazonium fluoborate, or from 2,5-ethoxy, 4-benzyl amino diazonium fluoborate, or from fluoborates of diphenyl amino diazo compounds which may or may not have fluorine as a component thereof, such as para-diphenyl amino diazonium fluoborate, para-fluorophenyl diazonium fluoborate, and from diazo fluoborates of metaphenylene diamine or from diazo fluoborates of diamines such as 1,5-naphthalene tetrazonium fluoborate. The diazo compounds that work best are the ones that are the least likely to fluorinate on the nucleus upon light exposure.

In general, it is believed that compounds capable of releasing hydrofluoric acid upon exposure may be formed by reaction of any of the light sensitive aryl diazonium compounds with fluoboric acids in substantially equimolecular proportions. It is believed that compounds other than the light or heat sensitive diazonium fluoborates can be used in the practice of this invention to liberate hydrofluoric acid upon exposure. For example, when an amino group is otherwise provided as in the organo-silicon compound itself, then other fluoborates less expensive than the diazo fluoborates can be used.

The organo-silicon component should be capable, when applied, of converting the lithographic surface into an ink receptive hydrophobic surface which repels water or other aqueous repellent ordinarily used for wetting the plate surface in lithographic printing. Best use is made of an organo-silicon polymer (polysiloxane) applied from solvent solution or aqueous dispersion. The organo-silicon polymers are water insoluble but use may be made of water soluble salts thereof (polysiloxanolates) formed by the reaction of the silane during hydrolysis and condensation polymerization in the presence of an alkali metal base, such as sodium or potassium hydroxide but preferably in the form of ammonium hydroxide. When the latter is used, the polymer formed becomes insolubilized on the plate surface upon drying, possibly by the elimination of ammonia. When an alkali metal polysiloxane is used, the polymer insolubilizes upon drying but it is desirable to acidify the material when dry to neutralize the base. The water soluble salts which are formed upon acidification may be removed by a separate rinsing step or as an incidence to the rinsing step used subsequent to exposure to remove the products produced by reaction between the organo-silicon and the released hydrofluoric acid.

Instead of the polymer, use may be made of the silane monomer or its hydrolysis products. Suitable silanes which may be used as such, its hydrolysis products (silanols) and its condensation polymerization products (polysiloxanes or polysiloxanolates) have the general formula $R_nSiX_{4-n}$ in which $n$ is either 1, 2 or 3. R is a monovalent group of the type hydrogen but at least one or more of the R groups is a monovalent organic radical of the type aliphatic, such as methyl, ethyl, propyl, butyl, vinyl, acrylyl and the like; aromatics, such as phenyl, naphthyl, tolyl, and the like; alkaryls such as mono-, di-, or tri-methyl phenyl, styryl and the like, or heterocyclics such as furfuryl. X is a readily hydrolyzable group such as a halogen group of the type bromine or chlorine or an oxy group of the type methoxy, ethoxy and the like.

Generally the silanes hydrolyze rapidly in aqueous medium to form corresponding silanols which immediately condense to form corresponding polymerization reaction products, especially in the presence of alkaline or acid catalyst. As a result, the silanes in general are applied in the desired concentration in solvent solution but they may be embodied in aqueous medium for application when sufficient alkali is present to maintain solubility of the monomer or of any silanol or polysiloxane formed. With an alkali metal base, larger polymers are formed than when ammonium hydroxide is used as the stabilizing agent and catalyst but application with ammonium hydroxide may be made from solutions having a lower pH of about 5–8 while a pH in excess of 9 is required when alkali metal bases are used.

As previously pointed out, the amount of organo-silicon applied should be sufficient to convert the surface into a water repellent, ink receptive, hydrophobic surface to form the image on the plate in unexposed areas but it should not be present in amount greater than that which is capable of being reacted substantially completely by the hydrofluoric acid released in the exposed areas to define the non-imaged portions of the plate. In this sense, the amount of organo-silicon and the character thereof must be balanced with the amount of hydrofluoric acid which is capable of being released from the diazo fluoborate upon exposure. In practice, the desired conversion can be secured by treating the surface with a composition containing as little as 0.2 percent by weight of the organo-silicon and up to 2.0 percent by weight thereof. Amounts in excess of 2.0 percent require relatively heavy concentrations of fluoborate and reactions substantially completely to destroy the ink receptive hydrophobic character of the organo-silicon in the exposed areas becomes more difficult.

It is preferred to air dry the coatings after they have been applied. Where the diazo fluoborate or other hydrofluoric acid releasing composition is able to withstand elevated temperatures, the drying of the coatings and insolubilization of the organo-silicon can be accelerated by heating to elevated temperature.

After exposure to the film or other positive to release hydrofluoric acid for reaction with the organo-silicon, the reacted materials may be removed by water but removal can be made more complete and effected more rapidly by washing off with aqueous compositions containing other ingredients such as phosphoric acid and the like.

When the organo-silicon is embodied in a solvent system, application of the diazo fluoborate is made separate therefrom. When applied separately, it is preferred to coat the plate with the fluoborate and then overcoat with the organo-silicon compound. Excellent results have also been secured when the fluoborate is overlaid on the silicone. Where a compatible mixture can be achieved as when the organo-silicon is dispersed as a stable resin in an aqueous medium or when the organo-silicon in the form of a silane, silanol or polysiloxanolate is contained in an aqueous medium in the presence of an alkali or its salt, the light sensitive diazo fluoborate or other hydrofluoric acid releasing compound may be dissolved in the aqueous medium for combination with the organo-silicon in a single treating composition. When applied in this manner, more intimate contact between the hydrofluoric acid and the organo-silicon is secured whereby it is possible to secure more complete reaction upon exposure through the film or other positive.

The silanols may be used as such dissolved in the aqueous medium when the organic group attached directly to the silicon atom contains an aromatic group which retards or prevents condensation reaction to form the polymer. Silanes of the type described include phenol silane triol, diphenol silane diol, and the like.

Representative of suitable polysiloxanes are methyl, phenyl, methyl phenyl polysiloxane, copolymers of phenyl methyl, phenyl and methyl siloxanes, and a compound of the type marketed under the trade name "Desicote" by Beckman Instruments, Inc. Representative of suitable polysiloxanolates are sodium divinyl polysiloxanolate, ammonium methyl phenyl, phenyl and methyl polysiloxanolate, and the like.

The following are representative of other organo-silicon compositions which may be applied separate and apart from the diazo fluoborate in the treatment of the lithographic surface:

*Example 2.*—0.4 percent by weight diethyl dichloro silane in benzene.

*Example 3.*—0.3 percent by weight propyl diethyl diethoxy silane in aromatic solvent.

*Example 4.*—0.5 percent by weight diphenol diol in water solution.

*Example 5.*—0.4 percent by weight phenyl triethoxy silane in aqueous solution containing sufficient ammonium hydroxide to adjust the pH to 7.5.

*Example 6.*—0.3 percent by weight sodium dimethyl, phenyl methyl polysiloxanolate in water solution.

*Example 7.*—0.6 percent by weight "Desicote" (Beckman & Company) in solvent solution in benzene.

*Example 8.*—0.4 percent methyl phenyl, phenyl methyl polysiloxane in aqueous dispersion.

The amount of diazonium fluoborate is not critical so long as sufficient is present under the conditions of reaction to degenerate the organo-silicon associated therewith in the exposed areas. However, it is desirable to maintain the concentration of the diazonium fluoborate as low as possible because they constitute relatively expensive materials. The following formulations are representative of compositions embodying both the diazonium fluoborate and the organo-silicon in a single treating composition:

*Example 9.*—0.2 percent by weight dimethyl phenyl methyl polysiloxane, 0.5 percent by weight para-dimethyl amino benzene diazonium fluoborate.

The diazonium fluoborate is dissolved in the aqueous medium and the polysiloxane incorporated therewith as a dispersion in aqueous medium with a suitable surface active agent.

*Example 10.*—0.4 percent by weight sodium polysiloxanolate, 0.8 percent by weight 2,5-ethoxy, 4-benzyl amino diazonium fluoborate.

The ingredients are dissolved in water to form an aqueous treating composition.

Depending upon the character and quality of the backing sheet containing the hydrophilic lithographic surface, lithographic plates of the character described imaged directly from a positive may be used for the reproduction of a large number of copies of good quality. It will be apparent from the description that the use of the presensitized plate eliminates many of the steps and limitations heretofore confronting the preparation of an image by photographic means in the manner described.

It will be understood that changes may be made in the details of the construction of the plate and in the use thereof for the preparation of an image and reproduction of copies therefrom without departing from the spirit of the invention, especially as defined in the following claims.

We claim:

1. A positive working lithographic plate comprising a backing sheet, a water receptive, ink repellent lithographic surface on the sheet, a coating on the lithographic surface containing light sensitive diazo fluoborate which releases hydrofluoric acid by reaction with ultraviolet light and an organo-silicon compound selected from the group consisting of a silane and a polysiloxane present in an amount to render the coated surface ink receptive and water repellent until reacted with the hydrofluoric acid released by the diazo fluoborate in the exposed areas.

2. A positive working plate as claimed in claim 1 in which the organo-silicon comprises a silane.

3. A positive working plate as claimed in claim 1 in which the organo-silicon compound comprises a polysiloxane.

4. A positive working plate as claimed in claim 1 in which the light sensitive diazo fluoborate and the organo-silicon compound are present in the same coating in admixture with each other.

5. A positive working lithographic plate comprising a flexible backing sheet, a water receptive, ink repellent lithographic surface on said backing sheet, a coating on said lithographic surface containing a diazo fluoborate which releases hydrofluoric acid upon activation with ultraviolet light and another coating superimposed on the diazo fluoborate containing an organo-silicon compound selected from the group consisting of a silane and a polysiloxane present in an amount sufficient to render the coated surfaces ink receptive and water repellent until reacted with hydrofluoric acid released from the diazo fluoborate in the exposed areas.

6. The method of preparing a positive working lithographic plate comprising the steps of coating a backing sheet having a lithographic surface with a composition containing a light sensitive diazo compound which releases hydrofluoric acid upon activation by light and an organo-silicon compound selected from the group consisting of a silane and a polysiloxane present in an amount to render the surface water repellent and ink receptive until reacted with the hydrofluoric acid released from the light sensitive material in the exposed areas, and drying the coating on the lithographic surface.

7. The method of preparing a positive working lithographic plate comprising the steps of coating a backing sheet having a lithographic surface with a light sensitive diazo fluoborate which releases hydrofluoric acid upon activation by ultraviolet light and an organo-silicon compound selected from the group consisting of a silane and a polysiloxane present in an amount to render the coated surface water repellent and ink receptive until reacted with the hydrofluoric acid released from the light sensitive material in areas exposed to light, and drying the coating on the lithographic surface.

8. The method of preparing a positive working lithographic plate as claimed in claim 7 in which the amount of diazo fluoborate in the coating composition is balanced with the amount of organo-silicon to release sufficient hydrofluoric acid upon activation by light substantially completely to react with the organo-silicon in the exposed areas.

9. The method of preparing a positive working lithographic plate comprising the steps of coating a backing sheet having a lithographic surface with a composition containing a light sensitive diazo fluoborate which releases hydrofluoric acid upon activation by ultraviolet light, drying the coating on the lithographic plate surface and then coating the surface with a composition containing an organo-silicon compound selected from the group consisting of a silane and a polysiloxane present in an amount sufficient to render the coated surface ink receptive and water repellent until reacted with the hydrofluoric acid released from the diazo fluoborate in the exposed areas, and drying the coating on the lithographic surface, the amount of diazo fluoborate applied by the first coating being balanced with the organo-silicon to release sufficient hydrofluoric acid substantially completely to convert with the organo-silicon in the activated areas to a state which can be washed off upon exposure to ultraviolet light.

10. The method of preparing an imaged positive working lithographic plate comprising the steps of exposing the plate produced by the method of claim 7 to ultraviolet light through a film or other positive whereby hydrofluoric acid is released from the diazo fluoborate in the exposed areas to convert with the organo-silicon associated therewith to a state wherein it loses its water repellency whereby the exposed areas become hydrophilic and receptive to repellent solution and the organo-silicon in the unexposed areas remains water repellent and ink receptive to form the image on the plate.

11. A positive working lithographic plate comprising a backing sheet, a water-receptive, ink-repellent, lithographic, hydrophilic surface on the sheet, a coating on the lithographic surface containing a light-sensitive diazo compound which releases hydrofluoric acid upon exposure to ultraviolet light and an organo-silicon compound selected from the group consisting of a silane and a polysiloxane present in an amount to render the coated surface ink-receptive and water-repellent until reacted with the hydrofluoric acid released from the light-sensitive compound upon exposure to light.

References Cited in the file of this patent

UNITED STATES PATENTS

| | | |
|---|---|---|
| 1,762,033 | Schmidt et al. | June 3, 1930 |
| 2,442,061 | Slifkin | May 25, 1948 |
| 2,598,453 | Slifkin | May 27, 1952 |

FOREIGN PATENTS

| | | |
|---|---|---|
| 402,737 | Great Britain | 1933 |
| 534,341 | Great Britain | Mar. 5, 1941 |